US011132913B1

(12) United States Patent
Ramanarayanan et al.

(10) Patent No.: US 11,132,913 B1
(45) Date of Patent: Sep. 28, 2021

(54) COMPUTER-IMPLEMENTED SYSTEMS AND METHODS FOR ACQUIRING AND ASSESSING PHYSICAL-WORLD DATA INDICATIVE OF AVATAR INTERACTIONS

(71) Applicant: Educational Testing Service, Princeton, NJ (US)

(72) Inventors: Vikram Ramanarayanan, San Francisco, CA (US); Mark Katz, Point Pleasant, NJ (US); Eric Steinhauer, Jenkintown, PA (US); Ravindran Ramaswamy, Bordentown, NJ (US); David Suendermann-Oeft, San Francisco, CA (US)

(73) Assignee: Educational Testing Service, Princeton, NJ (US)

( * ) Notice: Subject to any disclaimer, the term of this patent is extended or adjusted under 35 U.S.C. 154(b) by 1142 days.

(21) Appl. No.: 15/133,775

(22) Filed: Apr. 20, 2016

Related U.S. Application Data

(60) Provisional application No. 62/150,610, filed on Apr. 21, 2015, provisional application No. 62/150,368, (Continued)

(51) Int. Cl.
*G09B 9/00* (2006.01)
*G09B 5/06* (2006.01)
(Continued)

(52) U.S. Cl.
CPC ......... *G09B 5/065* (2013.01); *G06K 9/00315* (2013.01); *G06K 9/00362* (2013.01); *G06T 7/20* (2013.01); *G09B 7/02* (2013.01); *G10L 15/063* (2013.01); *G06T 2207/20081* (2013.01); *G06T 2207/30196* (2013.01)

(58) Field of Classification Search
None
See application file for complete search history.

(56) References Cited

U.S. PATENT DOCUMENTS

2013/0257877 A1* 10/2013 Davis ...................... A63F 13/12
345/473
2014/0295400 A1    10/2014 Zapata-Rivera et al.
(Continued)

OTHER PUBLICATIONS

Boersma, Paul, Weenink, David; Praat, a System for Doing Phonetics by Computer; Institute of Phonetic Sciences, University of Amsterdam; Technical Report 132; 1996.
(Continued)

*Primary Examiner* — James B Hull
(74) *Attorney, Agent, or Firm* — Jones Day

(57) ABSTRACT

Systems and methods are provided for acquiring physical-world data indicative of interactions of a subject with an avatar for evaluation. An interactive avatar is provided for interaction with the subject. Speech from the subject to the avatar is captured, and automatic speech recognition is performed to determine content of the subject speech. Motion data from the subject interacting with the avatar is captured. A next action of the interactive avatar is determined based on the content of the subject speech or the motion data. The next action of the avatar is implemented, and a score for the subject is determined based on the content of the subject speech and the motion data.

20 Claims, 13 Drawing Sheets

Related U.S. Application Data filed on Apr. 21, 2015, provisional application No. 62/157,503, filed on May 6, 2015, provisional application No. 62/169,752, filed on Jun. 2, 2015.

(51) Int. Cl.

| | |
|---|---|
| *G10L 15/06* | (2013.01) |
| *G06T 7/20* | (2017.01) |
| *G06K 9/00* | (2006.01) |
| *G09B 7/02* | (2006.01) |

(56) References Cited

U.S. PATENT DOCUMENTS

2014/0302469 A1   10/2014  Chen et al.
2015/0269529 A1    9/2015  Kyllonen et al.

OTHER PUBLICATIONS

Cabral, Joao, Campbell, Nick, Ganesh, Shree, Gilmartin, Emer; Haider, Fashih, Kenny, Eamonn, Kheirkhah, Mina, Murphy, Andrew, Chiarain, Neasa, Pellegrini, Thomas, Orozko, Odei; Milla: Multimodal Interactive Language Learning Agent; Enterface 2014; 2014.
Chang, Chih-Chung, Lin, Chih-Jen; LIBSVM: A Library for Support Vector Machines; ACM Transactions on Intelligent Systems and Technology, 2(3); Apr. 2011.
Chen, Lei, Yoon, Su-Youn; Application of Structural Events Detected on ASR Outputs for Automated Speaking Assessment; Proceedings of Interspeech; 2012.
Chen, Lei, Tetreault, Joel, Xi, Xiaoming; Towards Using Structural Events to Assess Non-Native Speech; Proceedings of the NAACL HLT 2010 Fifth Workshop on Innovative Use of NLP for Building Educational Applications; pp. 74-79; 2010.
Chen, Lei, Zechner, Klaus; Applying Rhythm Features to Automatically Assess Non-Native Speech; Proceedings of Interspeech; 2011.
Chen, Lei, Zechner, Klaus, Xi, Xiaoming; Improved Pronunciation Features for Construct-Driven Assessment of Non-Native Spontaneous Speech; Proceedings of the North American Chapter of the ACL, Human Language Technologies; pp. 442-449; 2009.
Chen, Lei, Feng, Gary, Joe, Jilliam, Leong, Chee Wee, Kitchen, Christopher, Lee, Chong Min; Towards Automated Assessment of Public Speaking Skills Using Multimodal Cues; Proceedings of the 16th International Conference on Multimodal Interaction; pp. 200-203; 2014.
Higgins, Derrick; Xi, Xiaoming, Zechner, Klaus, Williamson, David; A Three-Stage Approach to the Automated Scoring of Spontaneous Spoken Responses; Computer Speech and Language, 25; pp. 282-306; 2011.
Kapoor, Ashish, Picard, Rosalind; Multimodal Affect Recognition in Learning Environments; Proceedings of the 13th Annual ACM International Conference on Multimedia; pp. 677-682; 2005.
Lamere, Paul, Kwok, Philip, Gouvea, Evandro, Raj, Bhiksha, Singh, Rita, Walker, William, Warmuth, Manfred, Wolf, Peter; The CMU SPHINX-4 Speech Recognition System; Proceedings of the ICASSP; Hong Kong, China; 2003.
Mehrez, Tarek, Abdelkawy, Abdelrahman, Heikal, Youmna, Lange, Patrick, Nabil, Hadeer, Suendermann-Oeft, David; Who Discovered the Electron Neutrino? A Telephony-Based Distributed Open-Source Standard-Compliant Spoken Dialog System for Question Answering; Proceedings of the GSCL; Darmstadt, German; 2013.
Naim, Iftekhar, Tanveer, M. Iftekhar, Gildea, Daniel, Hoque, Mohammed; Automated Prediction and Analysis of Job Interview Performance: The Role of What You Say and How You Say It; Automatic Face and Gesture Recognition; 2015.
Nguyen, Laurent Son, Frauendorfer, Denise, Schmid Mast, Marianne, Gatica-Perez, Daniel; Hire Me: Computational Inference of Hirability in Employment Interviews Based on Nonverbal Behavior; IEEE Transactions on Multimedia, 16(4); pp. 1018-1031; Jun. 2014.
Pianesi, Fabio, Mana, Nadia, Cappelletti, Alessandro, Lepri, Bruno, Zancanaro, Massimo; Multimodal Recognition of Personality Traits in Social Interactions; Proceedings of the 10th International Conference on Multimodal Interfaces; pp. 53-60; 2008.
Ramanarayanan, Vikram, Van Segbroeck, Maarten, Narayanan, Shrikanth; Directly Data-Derived Articulatory Gesture-Like Representations Retain Discriminatory Information About Phone Categories; Computer Speech and Language; in press; Mar. 2015.
Sanchez-Cortes, Diarazalia, Biel, Joan-Isaac, Kumano, Shiro, Yamato, Junji, Otsuka, Kazuhiro, Gatica-Perez, Daniel; Inferring Mood in Ubiquitous Conversational Video; Proceedings of the 12th International Conference on Mobile and Ubiquitous Multimedia; 2013.
Schroder, Marc, Trouvain, Jurgen; The German Text-to-Speech Synthesis System MARY: A Tool for Research, Development and Teaching; International Journal of Speech Technology, 6(4); pp. 365-377; 2003.
Schuller, Bjorn, Steidl, Stefan, Batliner, Anton, Schiel, Florian, Krajewski, Jarek; The Interspeech 2011 Speaker State Challenge; Proceedings of Interspeech 2011, 12th Annual Conference of the International Speech Communication Association; pp. 3201-3204; 2011.
Schuller, Bjorn, Steidl, Stefan, Batliner, Anton, Noth, Elmar, Vinciarelli, Alessandro, Burkhardt, Felix, van Son, Rob, Weninger, Felix, Eyben, Florian, Bocklet, Tobias, Mohammadi, Gelareh, Weiss, Benjamin; The Interspeech 2012 Speaker Trait Challenge; Annual Conference of the International Speech Communication Association; 2012.
Suendermann-Oeft, David, Ramanarayanan, Vikram, Techenbrock, Moritz, Neutatz, Felix, Schmidt, Dennis; Halef: An Open-Source Standard-Compliant Telephony-Based Modular Spoken Dialog System—A Review and an Outlook; International Workshop on Spoken Dialog Systems (IWSDS); Busan, South Korea; 2015.
Taylor, Paul, Black, Alan, Caley, Richard; The Architecture of the Festival Speech Synthesis System; Proceedings of the ESCA Workshop on Speech Synthesis; Jenolan Caves, Australia; 1998.
Van Meggelen, Jim, Madsen, Leif, Smith, Jared; Asterisk: The Future of Telephony; Sebastopol, CA: O'Reilly Media; 2007.
Van Segbroeck, Maarten, Van Hamme, Hugo; Unsupervised Learning of Time-Frequency Patches as a Noise-Robust Representation of Speech; Speech Communication, 51(11); pp. 1124-1138; 2009.
Witt, Silke; Use of Speech Recognition in Computer-Assisted Language Learning; Unpublished Dissertation, Cambridge University Engineering Department; Cambridge, UK; 1999.
Yuan, Jiahong, Liberman, Mark; Speaker Identification on the SCOTUS Corpus; Journal of the Acoustical Society of America, 123(5); pp. 3878-3881; 2008.
Zechner, Klaus, Higgings, Derrick, Xi, Xiaoming, Williamson, David; Automatic Scoring of Non-Native Spontaneous Speech in Tests of Spoken English; Speech Communication, 51(10); pp. 883-895; 2009.
Ehsani, Farzad, Bernstein, Jared, Najmi, Amir; An interactive Dialog System for Learning Japanese; Speech Communication, 30(2-3); pp. 167-177; Feb. 2000.
Jeon, Je Hun, Yoon, Su-Youn; Acoustic Feature-Based Non-Scorable Response Detection for an Automated Speaking Proficiency Assessment; Proceedings 13th Annual Conference of the International Speech Communication Association, Interspeech; Portland, OR; Sep. 2012.
Prylipko, Dmytro, Schnelle-Walka, Dirk, Lord, Spencer, Wendemuth, Andreas; Zanzibar OpenIVR: An Open-Source Framework for Development of Spoken Dialog Systems; Proceedings of the 14th International Conference on Text, Speech and Dialog, 6836; Pilsen, Czech Republic; pp. 372-379; Sep. 2011.
Ranganath, Rajesh, Jurafsky, Dan, McFarland, Daniel; Detecting Friendly, Flirtatious, Awkward, and Assertive Speech in Speed-Dates; Computer Speech & Language, 27(1); pp. 89-115; Jan. 2013.
Schnelle-Walka, Dirk, Radomski, Stefan, Muhlhauser, Max; JVoiceXML as a Modality Component in the W3C Multimodal Architecture; Journal on Multimodal User Interfaces, 7(3); pp. 183-194; Nov. 2013.
Schreiber, Lisa, Paul, Gregory, Shibley, Lisa; The Development and Test of the Public Speaking Competence Rubric; Communication Education, 61(3); pp. 205-233; 2012.

(56) References Cited

OTHER PUBLICATIONS

Suendermann, David, Liscombe, Jackson, Pieraccini, Roberto, Evanini, Keelan; How Am I Doing?: A New Framework to Effectively Measure the Performance of Automated Customer Care Contact Centers; Advances in Speech Recognition; pp. 155-179; Aug. 2010.
Van Hamme, Hugo; HAC-models: A Novel Approach to Continuous Speech Recognition; In Interspeech, 9th Annual Conference of the International Speech Communication Association; Brisbane, Australia; pp. 2554-2557; Sep. 2008.
Xu, Yushi, Seneff, Stephanie; A Generic Framework for Building Dialogue Games for Language Learning: Application in the Flight Domain; Proceedings of SLATE; 2011.

* cited by examiner

COMPUTER-IMPLEMENTED SYSTEMS AND METHODS FOR ACQUIRING AND ASSESSING PHYSICAL-WORLD DATA INDICATIVE OF AVATAR INTERACTIONS

CROSS-REFERENCE TO RELATED APPLICATIONS

This application claims priority to U.S. Provisional Application No. 62/150,610, entitled "Efficient Interactor Scheduling and Assignment for the Candidate Interactive Assessment Tasks," filed Apr. 21, 2015; U.S. Provisional Application No. 62/150,368, entitled "Using Multimodal Dialog Technology for Assessment of Teachers' Classroom Interactions," filed Apr. 21, 2015; U.S. Provisional Application No. 62/157,503, entitled "Distributed Cloud-Based Dialog System for Conversational Learning and Assessment Applications," filed May 6, 2015; and U.S. Provisional Application No. 62/169,752, entitled "Using Multimodal Dialog Technology for Assessment of Teachers' Classroom Interactions," filed Jun. 2, 2015, the entirety of each of which is incorporated herein by reference.

FIELD

The technology described in this patent document relates generally to interaction evaluation and more particularly to evaluation of interactions with an avatar using multimodal data.

BACKGROUND

Automated assessment tools can greatly inform and enhance the efficacy, reliability, and scalability of systems for evaluating a person's ability to interact. Such assessment tools can be implemented in a wide variety of contexts, such as teacher licensure and related professional development products and services. There, a person's ability to communicate effectively and professionally with an audience of one or more people (e.g., a classroom, an interviewer) can be automatically assessed quickly and efficiently. Such evaluation can be based on the content of speech of the person being evaluated, as well as their body language. Automation can further be incorporated into the process by implementing the audience in a computerized fashion, such as via one or more avatars. Systems and methods as described herein provide mechanisms for providing low cost, consistent evaluations of persons' ability to communicate effectively using multimodal data (e.g., speech, body movement data) associated with their presentation.

SUMMARY

Systems and methods are provided for acquiring physical-world data indicative of interactions of a subject with an avatar for evaluation. An interactive avatar is provided for interaction with the subject. Speech from the subject to the avatar is captured, and automatic speech recognition is performed to determine content of the subject speech. Motion data from the subject interacting with the avatar is captured. A next action of the interactive avatar is determined based on the content of the subject speech or the motion data. The next action of the avatar is implemented, and a score for the subject is determined based on the content of the subject speech and the motion data.

As another example, a system for acquiring physical-world data indicative of interactions of a subject with an avatar for evaluation includes a processing system and a computer-readable medium encoded with instructions for commanding the processing system to execute steps of a method. In the method, an interactive avatar is provided for interaction with the subject. Speech from the subject to the avatar is captured, and automatic speech recognition is performed to determine content of the subject speech. Motion data from the subject interacting with the avatar is captured. A next action of the interactive avatar is determined based on the content of the subject speech or the motion data. The next action of the avatar is implemented, and a score for the subject is determined based on the content of the subject speech and the motion data.

As a further example, a non-transitory computer-readable medium is encoded with instructions for commanding a processing system to execute steps of a method for acquiring physical-world data indicative of interactions of a subject with an avatar for evaluation. In the method, an interactive avatar is provided for interaction with the subject. Speech from the subject to the avatar is captured, and automatic speech recognition is performed to determine content of the subject speech. Motion data from the subject interacting with the avatar is captured. A next action of the interactive avatar is determined based on the content of the subject speech or the motion data. The next action of the avatar is implemented, and a score for the subject is determined based on the content of the subject speech and the motion data.

DETAILED DESCRIPTION

Figure 1:
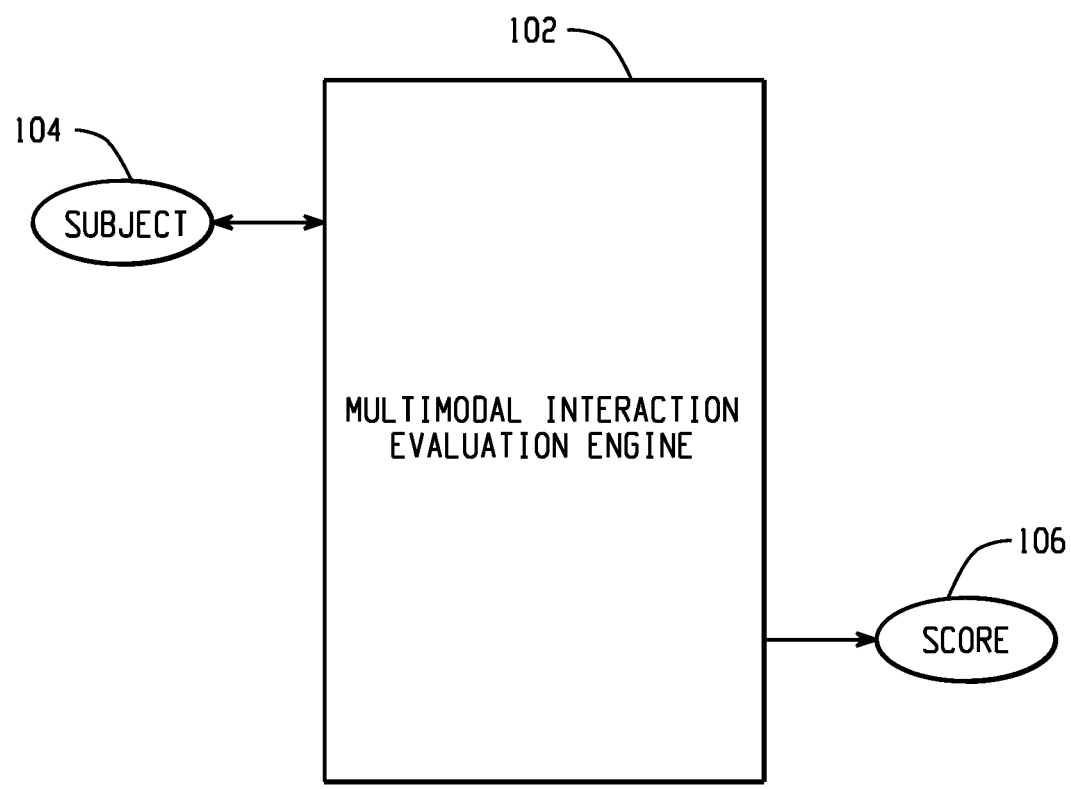
FIG. 1 is a diagram depicting a multimodal interaction evaluation engine.

FIG. 1 is a diagram depicting a multimodal interaction evaluation engine. A multimodal interaction evaluation engine 102 is configured to interact with a subject 104 and to provide a score 106 indicating a quality of the subject's interaction with the interaction evaluation engine 102.

Figure 2:
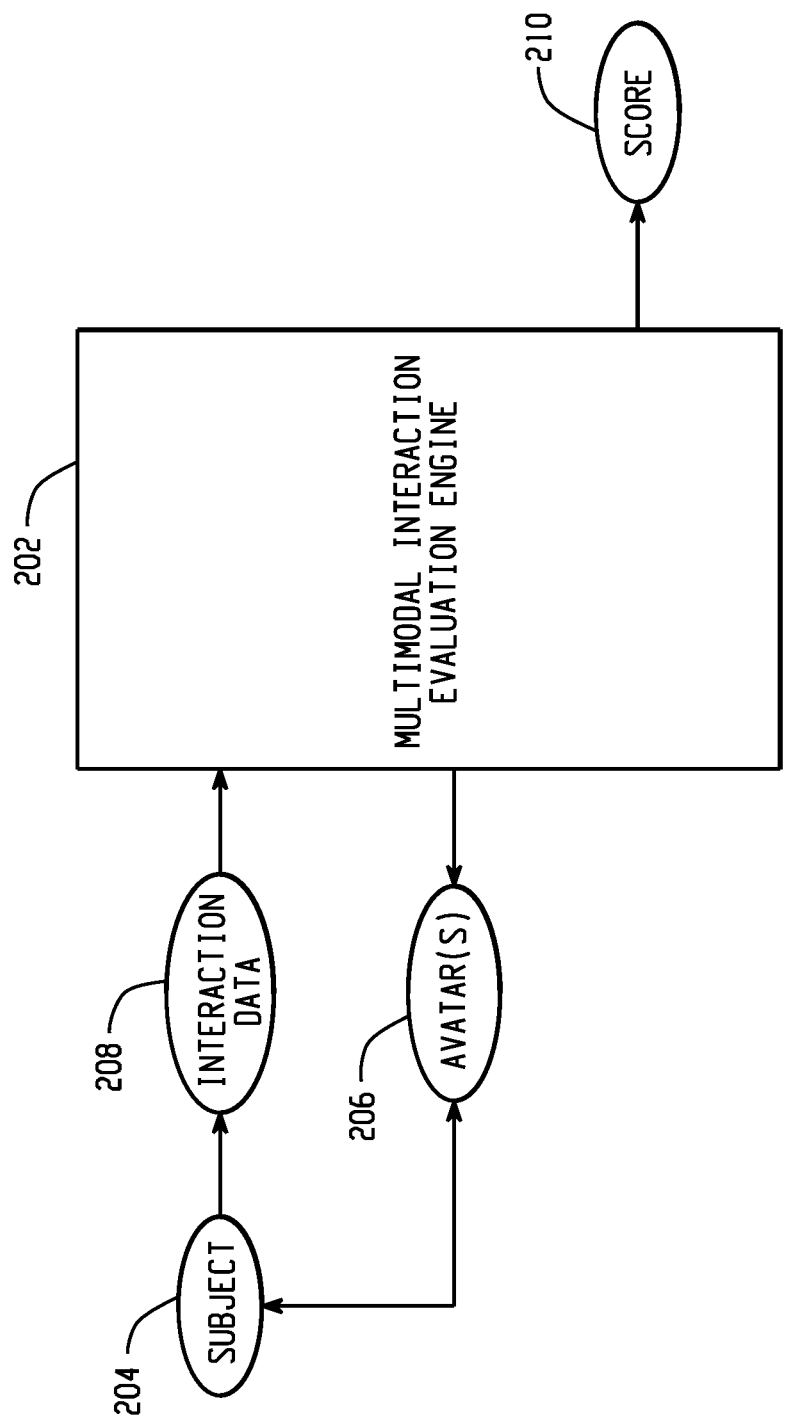
FIG. 2 is a diagram depicting a multimodal interaction evaluation engine that utilizes avatars to assess a subject.

FIG. 2 is a diagram depicting a multimodal interaction evaluation engine that utilizes avatars to assess a subject. In the example of FIG. 2, the interaction evaluation engine 202 interacts with the subject 204 by presenting one or more interactive avatars 206 (e.g., via a computer monitor or other display and speakers or headphones) to the subject 204, where the subject 204 is instructed to role play with the depicted avatars 206. The evaluation engine 202 may present the avatars 206 in a variety of contexts. For example, an evaluation engine 202 can be used as part of an interview process, where a screening (or entire) interview is conducted using the interaction evaluation engine 202 that depicts an avatar 206 that asks the subject 204 interview-type questions. In another example, the interaction evaluation engine 202 is provided as part of a teacher licensure evaluation or training tool. There, the interaction evaluation engine 202 depicts one or more avatars 206 that play the role of students, where the subject 204 is instructed to interactively teach a topic to the avatar-students 206. The interaction evaluation engine 202 captures data 208 associated with the subject's interaction with the avatar (e.g., speech data, motion data) and provides a score 210 indicating the quality of the subject's interactions 208.

Interactions 208 can be analyzed by measuring signals from multiple modalities, such as speech, video, and motion capture (e.g., using a Microsoft Kinect or other infrared detector or camera). The interaction evaluation engine 202 analyzes such heterogeneous multivariate streams of data, in one embodiment, and synthesizes, in real time, an appropriate audio or audiovisual response for the current context. Such processing can include audio-visual recognition, language and gesture understanding, and speech and avatar/talking head synthesis.

The interaction evaluation engine 202 can further use analysis and assessment techniques to automatically and reliably score various aspects of interaction 208 quality. For example, in a teacher evaluation context, the system can be configured to score various aspects of teaching proficiency, such as effectiveness of teaching or checking a student's understanding of a concept and engaging in an interactive discussion with the student to assess what the student does and does not understand. The system can evaluate spontaneous interactions, even where the subject 204 may backchannel, hesitate, or stutter when unsure. The depicted avatars 206 may also not always respond as expected. For example, a depicted student-avatar may not explicitly say that he does not understand a particular topic, but might instead look away from the subject 204 or get restless. Multiple sources of temporally evolving verbal and nonverbal behaviors can be evaluated as captured through the different modalities. Those behaviors can be used both to determine a next action of the depicted avatars and to evaluate the subject 204 to provide the score.

Figure 3:
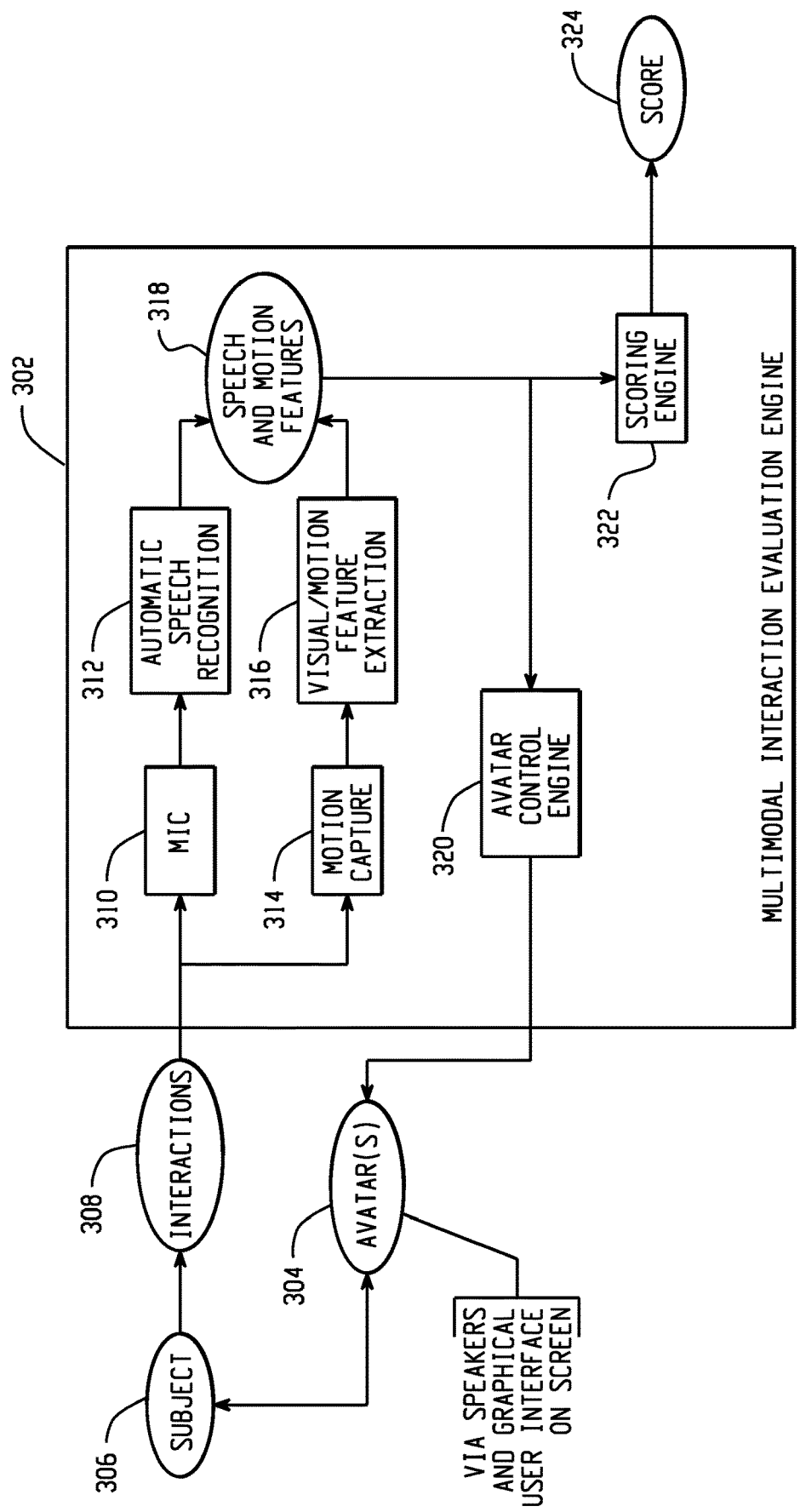
FIG. 3 is a diagram depicting example components of a system for acquiring physical-world data indicative of interactions of a subject with an avatar to perform an evaluation.

FIG. 3 is a diagram depicting example components of a system for acquiring physical-world data indicative of interactions of a subject with an avatar to perform an evaluation. A multimodal interactive evaluation engine 302 provides an interactive avatar 304 for interaction with a subject 306. The evaluation engine 302 captures interaction data 308 indicative of the subject's interactions with the avatar 304. In the example of FIG. 3, the engine 302 captures speech from the subject 306 to the avatar 304 via a microphone 310 and performs automatic speech recognition at 312 to determine content of the subject speech. The engine further captures motion data at 314 from the subject 306 interacting with the avatar 304 and performs visual/motion feature extraction at 316. The subject speech and the motion features 318 are provided to an avatar control engine 320 that is configured to determine a next action of the interactive avatar 304 based on the content of the speech and/or the motion data from 318. The avatar control engine 320 then implements the next action of the avatar 304. The subject speech and the motion data from 318 are further provided to a scoring engine 322 that determines a score 324 for the subject 306 based on the content of the subject speech and the motion data.

Speech and motion features utilized by the avatar control engine and the scoring engine can take a variety of forms. As described above, certain features can be based on speech extracted by automated speech recognition. In addition to content-based metrics, additional metrics associated with speech can be extracted, such as fluency, intonation, stress, rhythm, and pronunciation.

Figure 4:
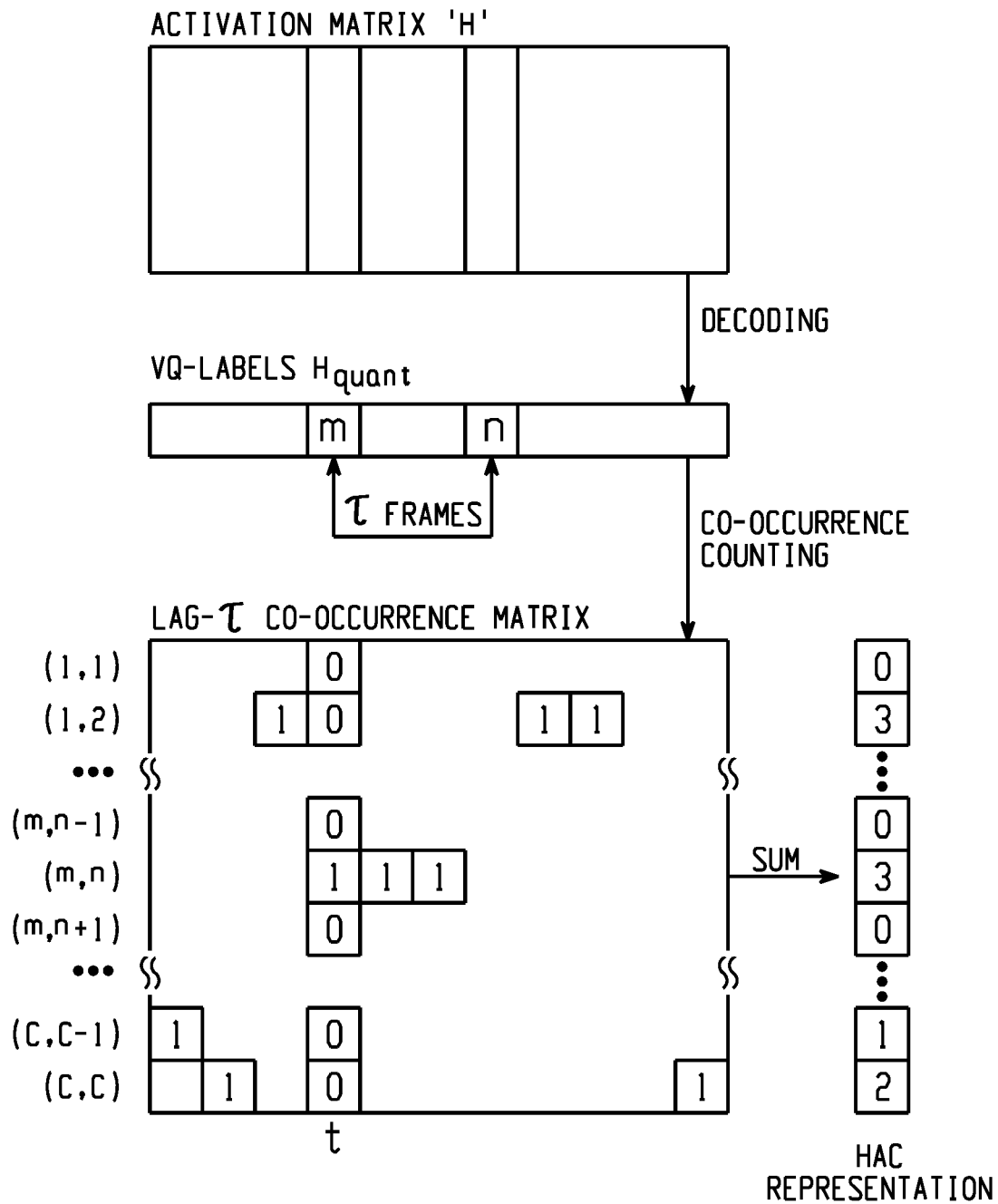
FIG. 4 is a diagram depicting a schematic for the computation of histograms of cooccurrences based on motion data.

FIG. 4 is a diagram depicting a schematic for the computation of histograms of cooccurrences based on motion data. In one example, for time-aggregated motion data acquired via an infrared or video sensor, statistical functionals of certain body point markers (e.g., shoulders, hips, hands, facial features) are calculated. A feature set is extracted based on the statistical functional, such as the mean and standard deviations of the hip markers, hand movement markers, and their speed. As depicted in FIG. 4, for a chosen lag value $\tau$ and a time step t, the system finds labels m and n occurring $\tau$ (marked in gold). The system marks the entry of the lag-$\tau$ occurrence matrix corresponding to row (m, n) and the $t^{th}$ column with a 1 (also indicated in gold). The system sums across the columns of this matrix across time to obtain the lag-$\tau$ histogram of cooccurrence representation.

The histogram of cooccurrence feature counts the number of times different prototypical body postures co-occur with each other at different time lags over the course of a time series. In one example, the prototypical body postures are determined using cluster centroids derived from K-means clustering on the space of body postures in a training data set as prototypical body postures. After performing the clustering, each frame in an input time series data matrix H from the capture device (e.g., the infrared detector) with a best matching cluster label. The data matrix is now represented by a single row vector of cluster labels, $H_{quant}$. A histogram of cooccurrence representation of lag T is then defined as a vector where each entry corresponds to the number of times all pairs of cluster labels are observed T frames apart. In other words, the system constructs a vector of lag-$\tau$ cooccurrences where each entry (m, n) signifies the number of times that the input sequence of activation frames is encoded into a cluster label m at time t (in the row vector $H_{quant}$), while encoded into cluster label n at time t+$\tau$. By stacking all (m, n) combinations, each interval can be represented by a single column vector where the elements express the sum of all $C^2$ possible lag-$\tau$ cooccurrences (where C is the number of clusters). The procedure can be repeated for different values of $\tau$, with the stack resulting in one "supervector." The dimensionality of the feature increases by a factor of $C^2$ for each lag value $\tau$ to be considered.

Figure 5:
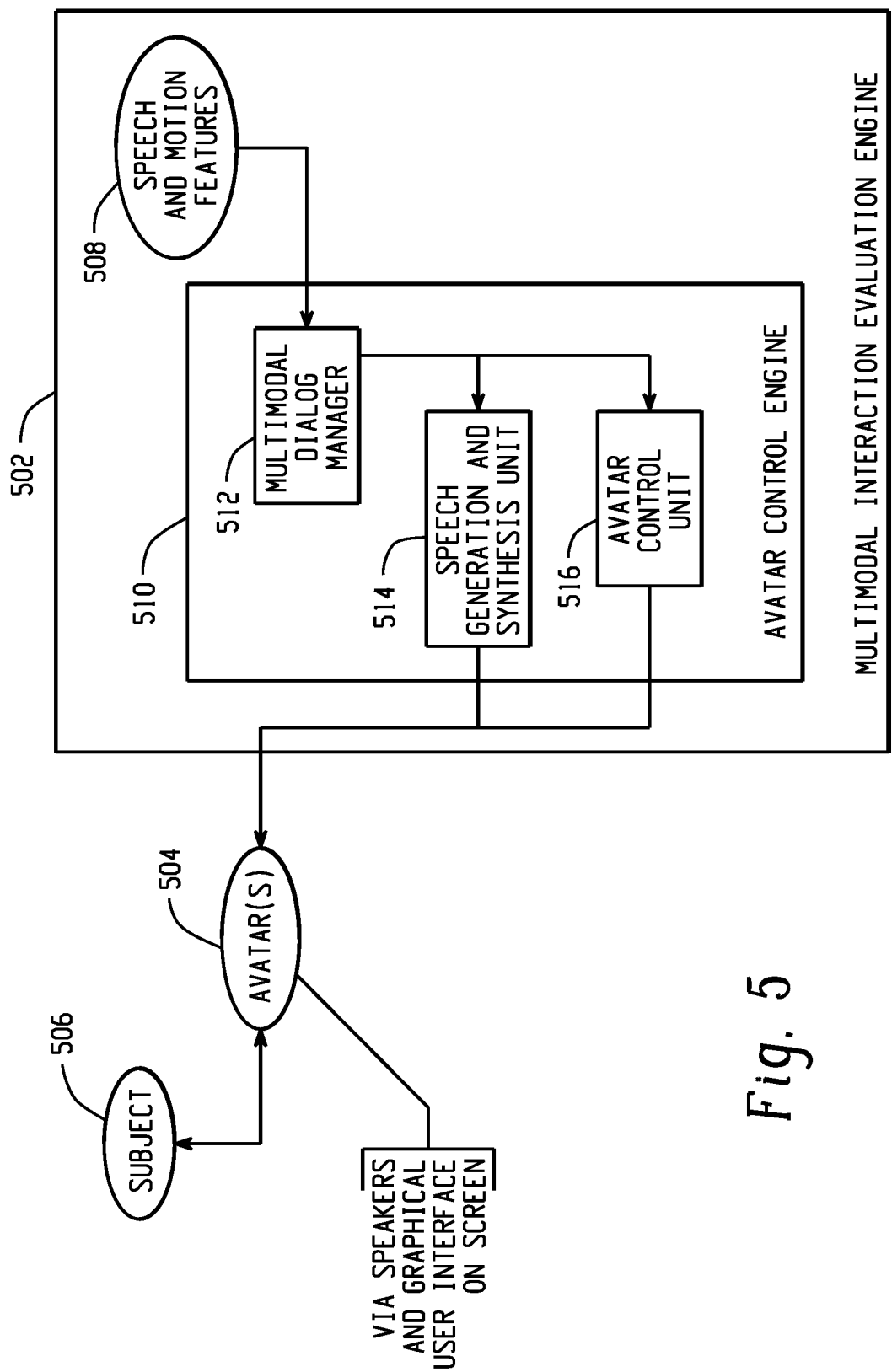
FIG. 5 is a block diagram depicting components of an example avatar control engine.

Using the speech and motion features, a multimodal interaction evaluation engine extracts metrics of a subject's interaction with avatars and determines a next action for the avatars. FIG. 5 is a block diagram depicting components of an example avatar control engine. An interaction evaluation engine 502 provides an avatar 504 with which a subject 506 interacts. As described above, data associated with the subject's interactions is captured and processed to formulate speech and motion features 508. Speech and motion features 508 are provided to an avatar control engine 510 to determine a next action of the interactive avatar 504. In the example of FIG. 5, the avatar control engine 510 includes a multimodal dialog manager 512 that receives the speech and motion features 508 to determine the next action of the interactive avatar. Having selected a next action based on the speech and motion feature inputs 508 and a current context, a speech generation and synthesis unit 514 and an avatar control unit 516 work together to augment the avatar 504 (e.g., a hologram, an entity depicted on a computer screen) to implement the next action. For example, the next action may include a depicted avatar speaking a word sequence. The speech generation and synthesis unit 514 receives those words and synthesizes those words as an outputted voice (or text), such as via speakers or headphones. The next action may further include body posture, facial expressions, lip movement, and emotion of the avatar 504. The avatar control unit 516 is configured to augment the outputted avatar 504 accordingly.

Figure 6:
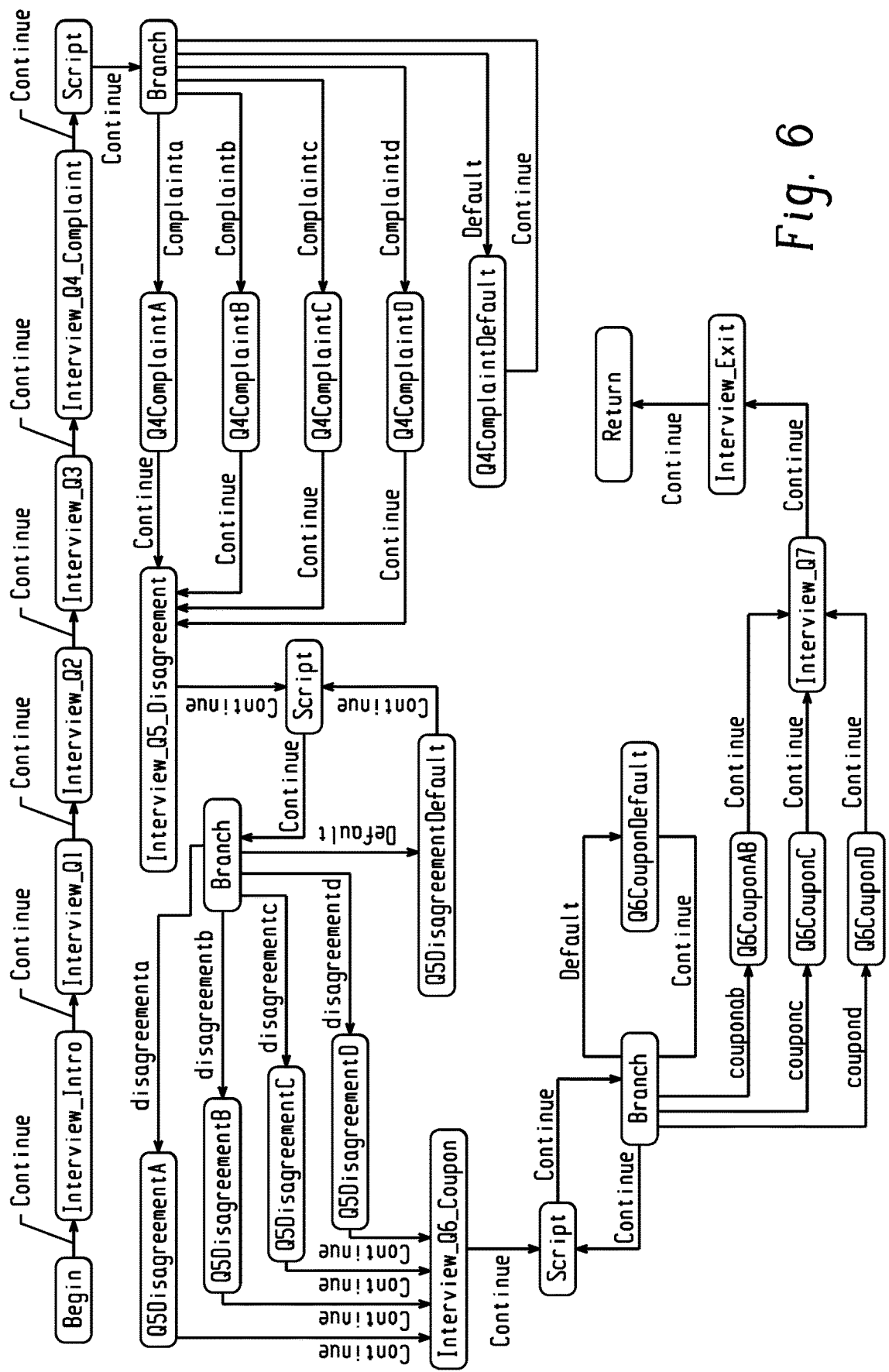
FIG. 6 is a diagram depicting a system for authoring multimodal interaction flows that a multimodal dialog manager uses to make decisions based on speech and motion features to control depicted avatars.

A multimodal dialog manager 512 may determine a next action of the interactive avatar(s) based on speech and motion features associated with a subject in a variety of ways. FIG. 6 is a diagram depicting a system for authoring multimodal interaction flows that the multimodal dialog manager uses to make decisions based on speech and motion features to control depicted avatars. The system is based on graphical workflow descriptions of underlying logic which can be implemented by designers to build complex interaction scenarios. In one embodiment, drag-and-drop shapes controlling question and response behavior can be utilized to specify models and parameters to control speech recognition, visual and motion feature extraction, and understanding of those metrics. Based on received speech and motion features, a next action is selected based on the depicted map, and an avatar's speech and visual generation is executed accordingly. In one embodiment, an action map, as depicted in FIG. 6 is authored using OpenVXML (e.g. using an HALEF framework) that allows designers to author dialog workflows using a graphical user interface. The system enables designers to specify the dialog workflow as a flowchart of different dialog states and to include details of specific grammar files and speech audio files (e.g., Voice Extensible Markup Language (VoiceXML)) to be used by the speech recognizer and text-to-speech prompts that need to be synthesized. These grammar files can be of varying formats including JSFG (Java Speech Grammar Format), SRGS (Speech Recognition Grammar Specification) and ARPA (Advanced Research Projects Agency) formats. In addition, a designer can insert so-called "script" blocks of Javascript-like code into the workflow that can be used to perform processing steps, such as basic natural language understanding of the speech recognition. Further details regarding the creation of dialog workflows and their contents can be found in sections 2 and 2.1 and FIG. 2 (which illustrates an example workflow design of an interview test system using the OpenVXML tooklit) of the paper entitled "Toward an open-source dialog spoken dialog framework for developing conversation-based educational applications" included in U.S. Pat. No. 62/140,368 which, as noted above, is fully incorporated by reference. Moreover, additional details regarding the dialog workflow including the use of grammar and speech audio files can be found in the paper entitled "Toward a distributed cloud-based dialog system for conversational application development" included in U.S. Pat. No. 62/157,503 which, as noted above, is fully incorporated by reference.

The HALEF (Help Assistant-Language-Enabled and Free) framework leverages different open-source components to form an spoken dialog system (SOS) framework that is modular and industry-standard-compliant: Asterisk, a SIP—(Session Initiation Protocol) and PSTN—(Public Switched Telephone Network) compatible telephony server; JVoiceXML, an open-source voice browser that can process SIP traffic via a voice browser interface called Zanzibar; Cairo, an MRCP (Media Resource Control Protocol) speech server, which allows the voice browser to initiate SIP or RTP (Real-time Transport Protocol) connections from/to the telephony server; the Sphinx automatic speech recognizer; Festival and Mary text-to-speech synthesis engines; and an Apache Tomcat-based web server that can host dynamic VoiceXML (VXML) pages and serve media files such as grammars and audio files to the voice browser. Note that unlike a typical SOS, which consists of sequentially-connected modules for speech recognition, language understanding, dialog management, language generation and speech synthesis, in HALEF some of these are grouped together forming independent blocks which are hosted on different virtual machines in a distributed architecture. In this framework, one can serve different back-end applications as standalone web services on a separate server. Incorporating the appropriate start URL of the web service in the VXML input code that the voice browser interprets will then allow the voice browser to trigger the web application at the appropriate point in the callflow. The web services in some cases typically take as input any valid HTTP-based GET or POST request and output a VXML page that the voice browser can process next. Below is described a software toolkit for implementing aspects of the current subject matter that can generate a sequence of VXML pages from a dialog How specification.

Note that HALEF makes no assumptions on the specifics of the dialog management system used. One could choose to use a specific rule-based call flow management routine (in which case one would have to generate VXML pages corresponding to actions for each rule branch of the routine) or a statistical system, such as one based on Partially Observable Markov Decision Processes (which one could implement as a separate web service that returns an appropriate VXML page detailing the next action to be taken by the SOS). In an example interview application, rule-based natural language understanding modules are used their relative ease of design. HALEF supports the use of either JSGF (Java Speech Grammar Format) and ARPA (Advanced Research Projects Agency) formats to specify grammars. This modularity in design is intended to allow users more flexibility and ease of use in adapting HALEF to different use cases and environments.

A logging interface was developed that helps users view log messages from the Tomcat server, speech server and voice browser in real time to facilitate debugging and understanding of how to improve the design of the item workflow. This web-based tool allows designers to observe in real time the output hypotheses generated by the speech recognition and natural language understanding modules at each dialog state, as well as hyperlinks to the grammars and speech audio files associated with that state. This allows even workflow designers with minimal spoken dialog experience to monitor and evaluate system performance while designing and deploying the application.

Also integrated into the HALEF framework is Open VXML (or Open Voice XML), an open-source software package written in Java that allows designers to author dialog workflows using an easy-to-use graphical user interface, and is available as a plugin to the Eclipse Integrated Developer Environment. Open VXML allows designers to specify the dialog workflow as a flowchart, including details of specific grammar files to be used by the speech recognizer and text-to-speech prompts that need to be synthesized. In addition, designers can insert so-called script blocks of Javascript-like code into the workflow that can be used to perform simple processing steps, such as basic natural language understanding on the outputs of the speech recognition, for example. The entire workflow can be exported to a Web Archive (or WAR) application, which can then be deployed on a web server running Apache Tomcat that serves Voice XML (or VXML) documents.

As an example, a workflow of a conversational interview item developed using Open VXML can illustrate that a caller dials into the system, answers a few basic questions (which are simply stored for later analysis), and then proceeds to answer a sequence of yes/no type interview questions. Depending on whether the callers' answers are affirmative or negative (as determined by the output of the speech recognizer and the natural language understanding module), they are redirected to the appropriate branch of the dialog tree and the conversation continues until all such questions are answered. Notice that in the case of this simple example rule-based grammars and dialog tree structures can be used in favor of more sophisticated statistical modules; though the system can also natively support the latter.

In order to better understand how the system performs when actual test takers call in, a small-scale internal study was conducted. Twenty three researchers were provided with a sample test taker's resume and requested them to call into the system as that candidate. The researchers were asked them to rate various aspects of their interaction with the system on a scale from 1 to 5, 1 being least satisfactory and 5 being most satisfactory. The results of this user evaluation are listed in Table 1.

TABLE 1

User evaluation results (ratings were on a scale of 1 to 5, with 1 being least satisfactory and 5 being most satisfactory).

| Dimension | Mean ± Std. Err | Median |
| --- | --- | --- |
| Extent to which call was completed | 4.04 ± 0.19 | 4 |
| How easy was it to understand the system? | 3.19 ± 0.19 | 3 |
| How well did the system understand you? | 3 ± 0.24 | 3 |
| How appropriate were the system responses? | 3.19 ± 0.16 | 3 |
| Overall caller experience (user rated) | 3.22 ± 0.15 | 3 |

It was found that most users were able to complete the call into the application (22 out of 29 calls placed). However, it was found that there was still plenty of scope for improvement with respect to how easy it was to understand the system prompts as well as how appropriate they were, with a median rating of 3. The median user rating of 3 ("satisfactory") for the 'system understanding' category is not surprising, given that we are using unsophisticated rule-based grammars and natural language understanding. Overall, users felt that the system performed satisfactorily, with a median self-rated caller experience rating of 3.

In addition, four expert reviewers listened to each of the full-call recordings, examined the call logs and rated each call on a range of dimensions. These dimensions include:

Audio quality of system responses: This metric measures, on a scale from 1 to 5, how clear the automated agent is. A poor audio quality would be marked by frequent dropping in and out of the automated agent's voice, or muffled or garbled audio.

Qualitative latency score: How minimal is the average delay between the automated agent's responses from the time the user finishes speaking?

Incorrect voice activity detection: Counts the number of times the user's legitimate speech input was missed by the voice activity detection application.

Caller experience: A qualitative measure of the caller's experience using the automated agent, with 1 for a very bad experience and 5 for a very good experience.

Caller cooperation: A qualitative measure of caller's cooperation, or the caller's willingness to interact with the automated agent, with 1 for no cooperation and 5 for fully cooperative.

It was found that a large percentage of calls received a high median rating (4 or 5) for latency and audio quality, suggesting that the interactions did not suffer from major speech degradation or intelligibility issues. Further, the average number of times the voice activity detection module either failed to capture legitimate speech input, or assumed speech input where there was none was 0.62±0.92, which is a reasonable figure. It was also shown that a large proportion of callers were willing to cooperate with the automated agent, which bodes well for future implementation of such applications. However, it was shown that there is room for improvement as far as the overall caller experience is concerned, with experts giving a median rating of 3 in this case (which is consistent with user-rated caller experience rating as well). This is understandable given the canned nature of some of the prompts which may lead to pragmatically inappropriate responses and the simplistic rule-based nature of the grammars, language understanding, and dialog management. Indeed, it was observed that the median number of spoken language understanding (SLU) errors aggregated across all expert raters was 1 (out of a maximum of 4).

Figure 7:
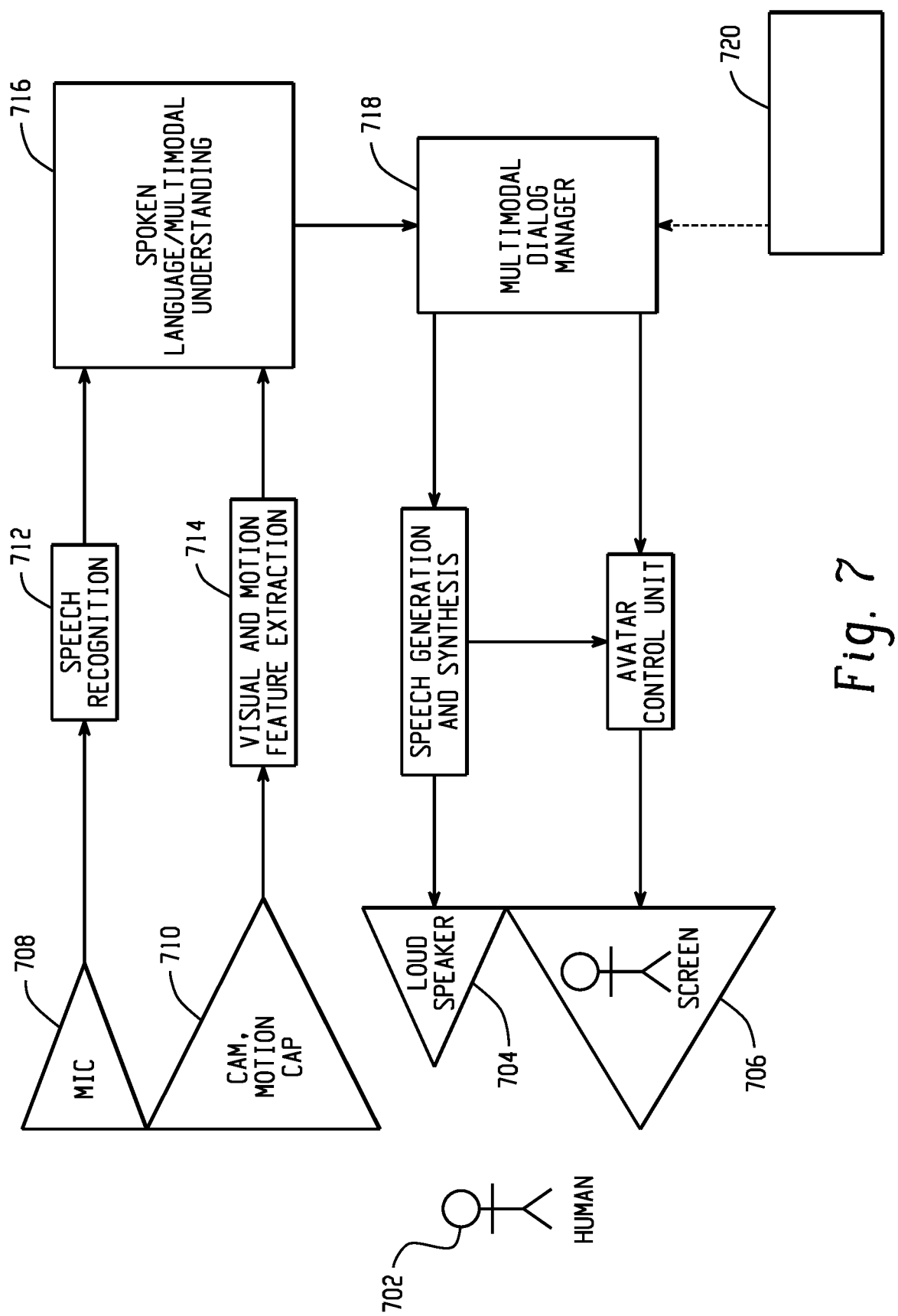
FIG. 7 is a diagram depicting an example visualization of control of communications between a multimodal interaction evaluation engine and a subject.

FIG. 7 is a diagram depicting an example visualization of control of communications between a multimodal interaction evaluation engine and a subject. An avatar is presented to a human subject 702 via a speaker 704 and a screen 706. The human subject 702 interacts with the avatar, and data associated with those interactions is captured via a microphone 708 and a motion capture system or camera 710. Data captured using the microphone is passed to an automatic speech recognizer at 712 to generate speech content data. Data captured at 710 undergoes visual and motion feature extraction at 714 to generate motion data. The speech and motion data are aggregated at 716. That data 716 is provided to a multimodal dialog manager 718 that utilizes a map 720 (e.g., a map as described above with reference to FIG. 6) to select a next action for the interactive avatar based on the content of the subject speech and/or the motion data from 716. A speech generation and synthesis unit 722 generates speech associated with the next action for output via the speaker 704, while an avatar control unit controls the avatar displayed on the screen 706, including body posture, facial expressions, lip movements, and emotions of the avatar.

Figure 8:
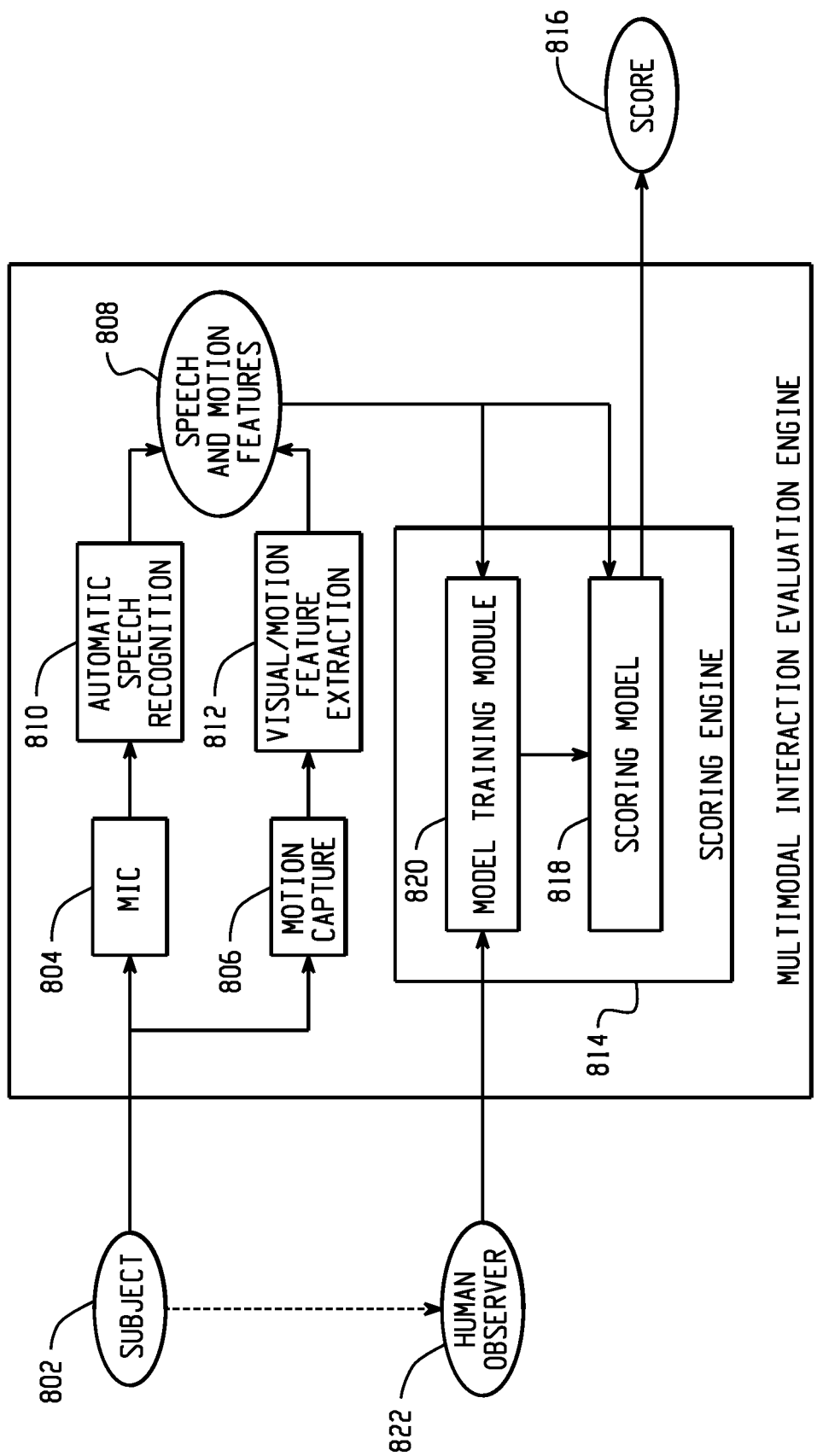
FIG. 8 is a block diagram depicting a scoring engine of an interaction evaluation engine.

As noted above, in addition to controlling an interactive avatar, a multimodal interaction evaluation engine also evaluates a quality of a subject's interactions to generate a score. FIG. 8 is a block diagram depicting a scoring engine of an interaction evaluation engine. Interactions of a subject 802, such as with a depicted avatar or a human (not shown) are captured by a microphone 804 and motion capture device 806 to generate speech and motion features 808 at 810, 812, respectively. The speech and motion features 808 are provided to a scoring engine 814 that is configured to generate a score 816 indicating a quality of the subject's interactions. In an operation mode, the speech and motion features 808 are provided to a scoring model 818 of the scoring engine 814. The scoring model 818 generates the score 816 based on the speech and motion features 808. In one example, the scoring model 818 includes a formula that weights different features 808 (e.g., speech content, histogram of cooccurrence data) to autonomously generate a weighted sum or average that is converted into the subject's score 816.

In one example, the scoring model 818 is trained by a model training module 820 that utilizes human observer 822 input in training the scoring model 818. In one training example, a subject 802 interacts with an avatar or person. That interaction is captured at 804, 806 and processed at 810, 812 to generate speech and motion features 808. Those features are received by the model training module 820 along with a human observer's scoring of the interaction. The extracted features 808 are correlated with the human observer 822 scores to train the scoring model 818, such as by using multiple regression techniques to determine feature weights of the scoring model.

Figure 9:
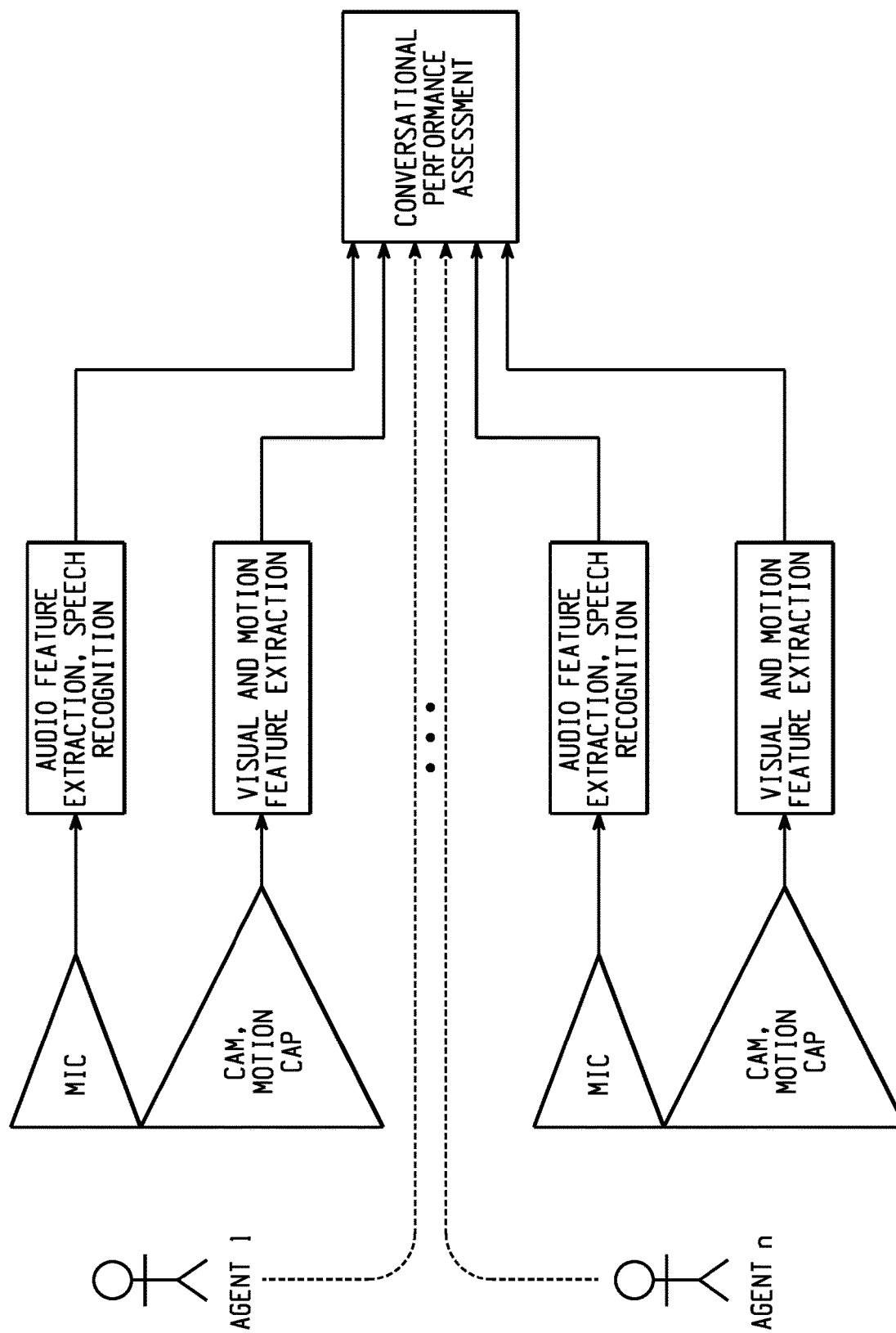
FIG. 9 is a diagram depicting a system for generating conversational performance assessments.

FIG. 9 is a diagram depicting a system for generating conversational performance assessments. The system of FIG. 9 enables scoring of interactions of multiple persons in parallel, such as at a testing center where multiple persons are evaluated in parallel. In another example, the system can be utilized in a distributed fashion, where each subject performs their interactions at different locations (e.g., at home), with data captured by a microphone and camera/motion capture device being used to extract features that are compiled at a conversational performance assessment unit. Those extracted features are provided to one or more scoring models to generate individual scores for each subject that indicate the quality of that subject's interactions (e.g., with an avatar).

Figure 10:
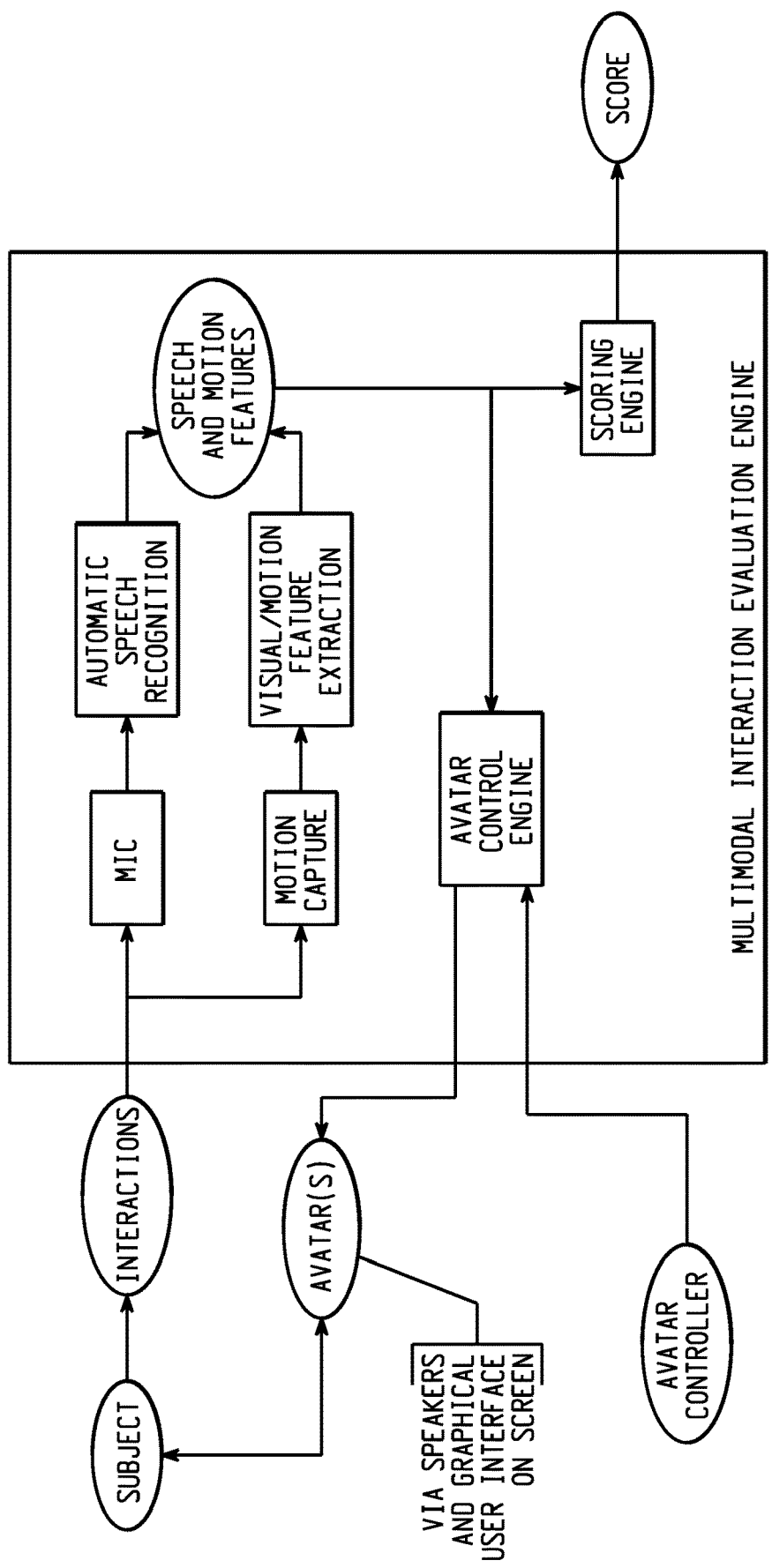
FIG. 10 is a diagram depicting a multimodal interaction evaluation engine that utilizes some human avatar control.

As noted above, a multimodal interaction evaluation engine can be configured to automatically and autonomously control avatars that are presented to a subject whose interactions are being evaluated. In one embodiment, an interaction evaluation engine may also receive inputs from an avatar controller to provide semi-automated avatar presentation. FIG. 10 is a diagram depicting a multimodal interaction evaluation engine that utilizes some human avatar control. Such human avatar control can be useful in a variety of contexts. For example, where a multimodal interaction evaluation engine is being utilized in an interview context, a first one or more rounds of interviews can be performed using a wholly automated avatar, controlled by an avatar control engine without human interaction. Should a subject do sufficiently well (e.g., as indicated by a score) to warrant further consideration, subsequent rounds of the interview can be controlled, at least in part by a human avatar controller. In one embodiment, the interview environment may not change, such that the subject is unaware that a human is currently in the avatar control loop (e.g., the avatar controller's commanded speech and avatar behavior are still synthesized and communicated through the avatar control engine). As another example, in a teacher exercise or evaluation, a human avatar controller may control one student avatar of a classroom of student avatars that the subject is tasked with teaching about a topic.

In order to facilitate scheduling of human avatar controllers, especially in systems where multiple subjects are being evaluated at or near the same time, a multimodal interaction evaluation engine may implement a human interactor scheduling engine. At any given time, there could be several candidates taking an assessment, and those candidates could be working on various tasks, some or all of which are supported by human interactors. Because of the dynamic nature and timing of the interactions, the matching of the qualified interactors to handle the candidate task can be challenging because assignment should be instantaneous and accurate, following all of the rules as well as the availability of the interactors. Example rules include constraints where an interactor cannot be assigned to the same candidate for more than one exercise or to a candidate that the interactor knows from outside of the exercise. Certain education, certification, or experience requirements may be selectively applied depending on the context of an examination.

Figure 11:
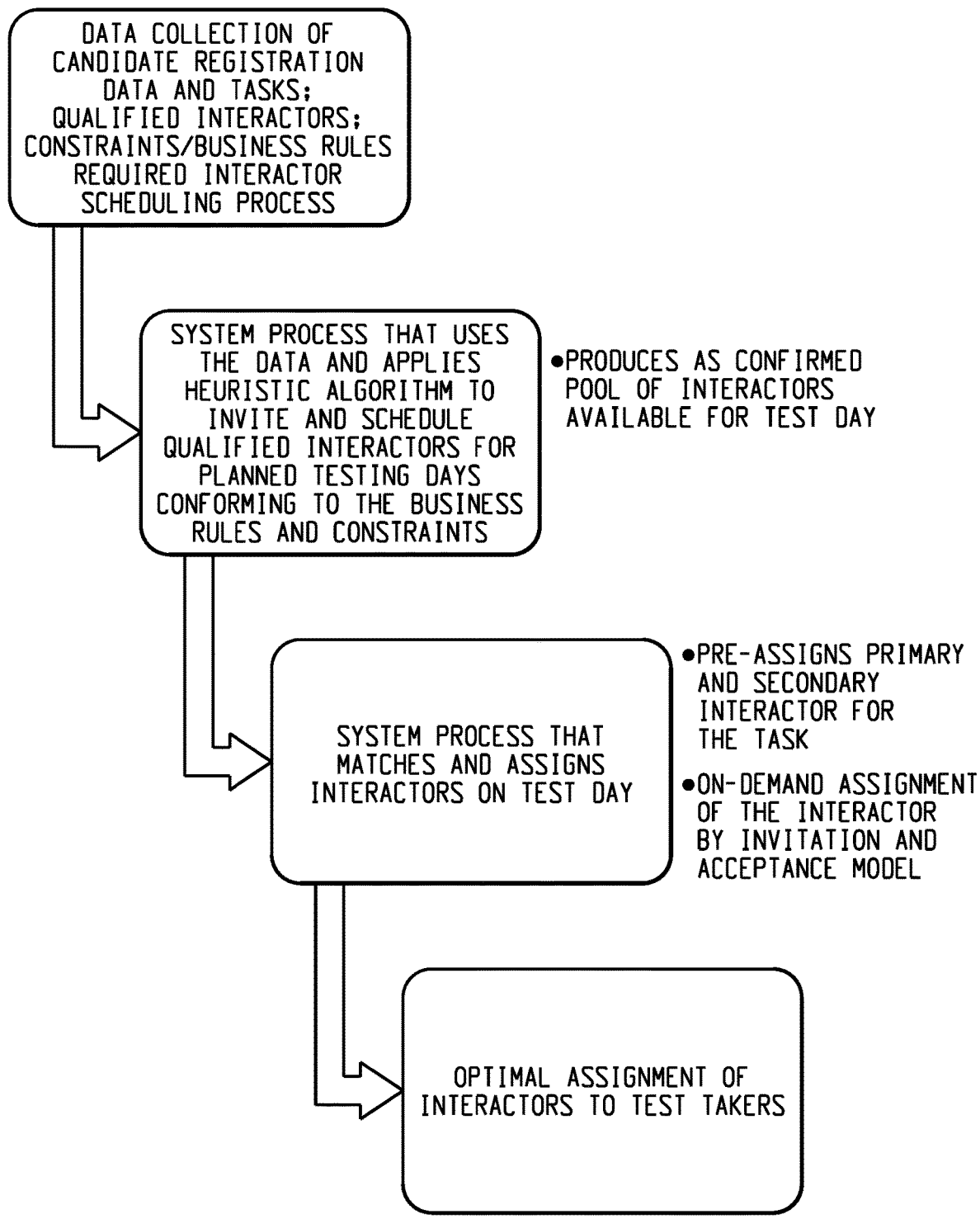
FIG. 11 is a diagram depicting an example algorithm of a human interactor scheduling engine.

FIG. 11 is a diagram depicting an example algorithm of a human interactor scheduling engine. In one embodiment, a scheduling engine operates as a two stage process. In a first stage, prior to the test day, the engine receives certain inputs regarding anticipated test takers and invites an appropriate set of interactors to handle the volume of test takers for the assessment duration. The engine builds a roster of accepted interactors and schedules them for the interaction sessions on the test day. This process is repeated until the system assembles a confirmed roster of qualified interactors for the test day. The engine receives some or all of: a roster of scheduled test takers includes appointment date and time; scheduled tasks that will be performed by the test taker; a pool of certified interactors for the tasks to be performed; availability information of interactors; test taker profile, background, and demographic information; interactor profile, background, and demographic information; and information on any previous interactions between the test taker and interactor. The engine outputs one or more of: a forecast of required interactors; a forecast of overage (backup interactors); invitations to interactors; invitation acceptance from the interactor; confirmation of the schedule with the interactors.

In a second stage, on the test day, when a candidate is checked in to the test center, the system will assign interactors to all test taker tasks. The system assigns each test taker task with at least one primary interactor and a possible secondary interactor for each task. The assignment logic uses a set matching, randomization, and scoring logic to narrow down the interactors who have logged into the system. A primary interactor may be determined by applying a number of filters to the pool of available interactors to try to find one or more exact matches for the interaction criteria. If any interactors match all criteria, then a primary interactor is selected from the exact matches. If no exact matches are found, then one or more criteria is relaxed until a pool of sufficiently matching interactors is identified. A notification is sent to assigned logged-in interactors as soon as the test taker starts the assessment. During the testing process the test taker and interactor might have to prepare for the interaction based on their assigned task description. The lead time notification will allow interactor to get ready for the interaction. Before the candidate initiates the interaction an invitation is sent to the primary interactor for interaction. If the primary interactor accepts the interaction, then the task gets started as expected. If the primary interactor does not accept in the allowed time, then the backup interactor is expected to answer the request. If the second interactor also did not accept, then a broadcast message is sent to all the qualified interactors on the task, and whoever is available would accept the invitation. The allocated task (prompt) to the candidate may also be staggered so that candidates are assigned to various tasks to efficiently balance the downtime of the interactors. The system uses heuristic matching algorithm optimizing candidate wait time and interactor unused time. The system receives one or more of: a planned schedule from Pre-Test Day Scheduling; a list of confirmed/logged-in interactors; a list of interactors that cannot perform the scheduled task specified in the Pre-Test Day Scheduling; a list of checked in Test Takers; a list of Test Takers unable to test at their planned task time; a list of Test Takers completing a specific task; shift start, end times, and break times; a list of registered candidates; a current task assignment of the interactors and scheduled time to finish. The system outputs one or more of: an optimal assignment of an interactor to a test takers task; an assignment of backup interactors to the task; an invitation to the primary or secondary interactors; broadcastings to the available qualified interactors when necessary.

Figure 12A:
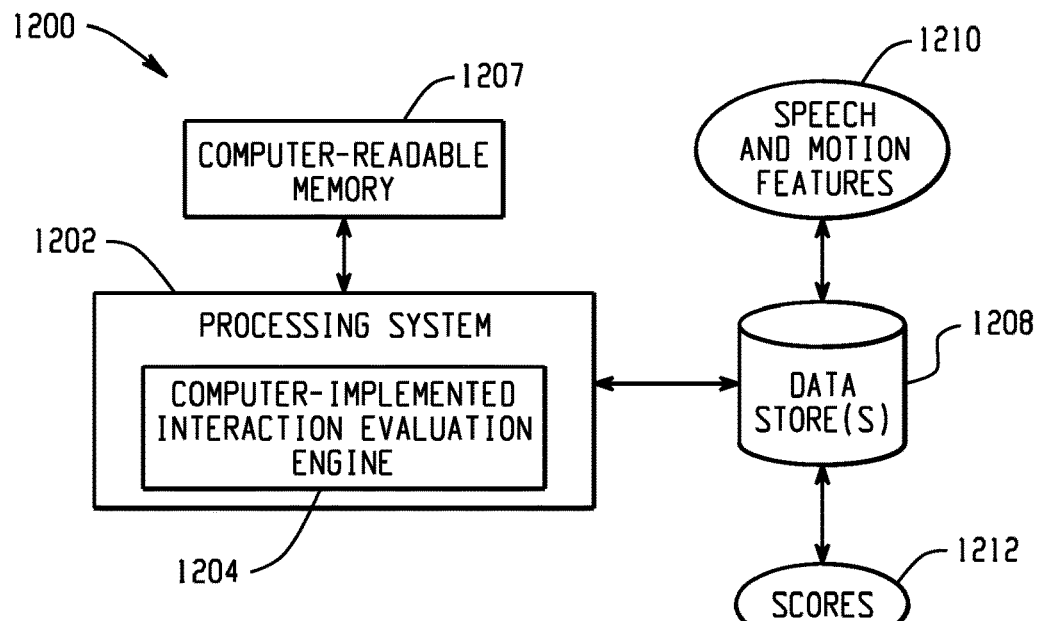
FIGS. 12A, 12B, and 12C depict example systems for implementing the approaches described herein for implementing a computer-implemented interaction evaluation engine.
Figure 12B:
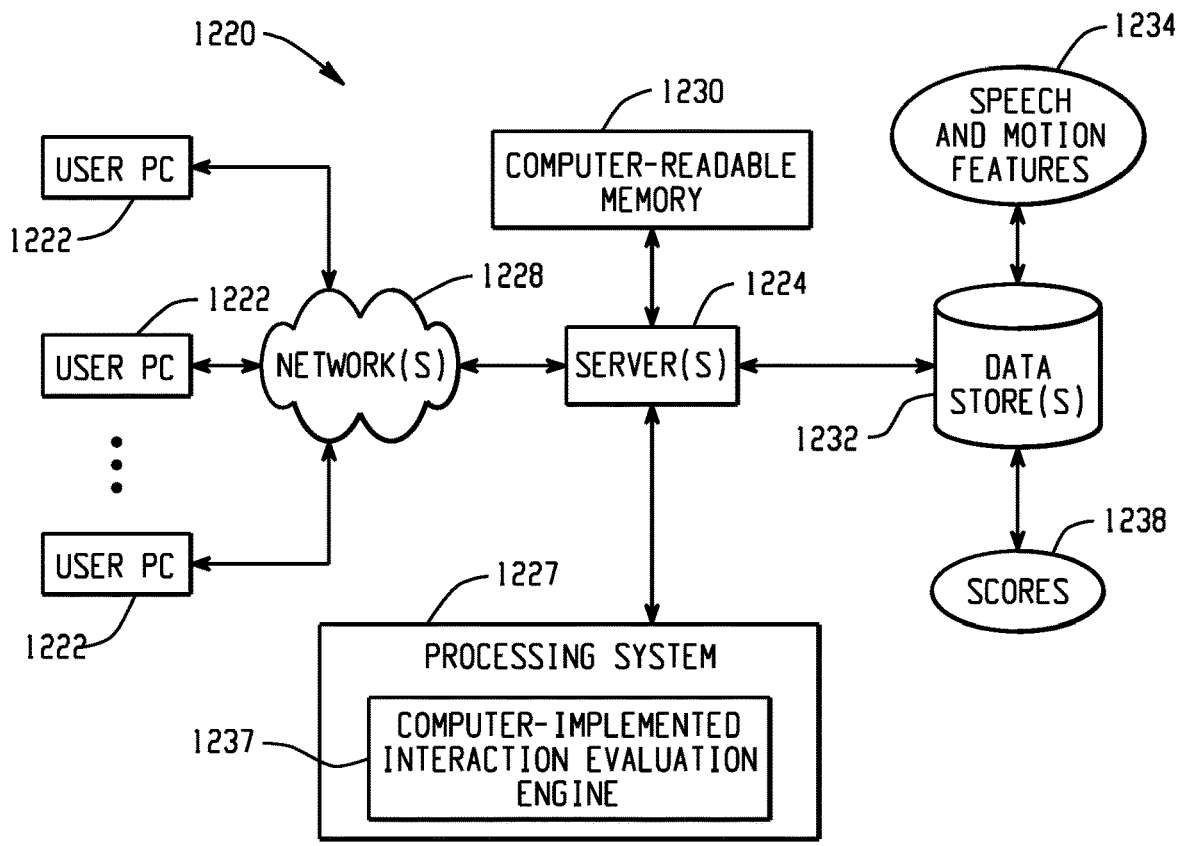
Figure 12C:
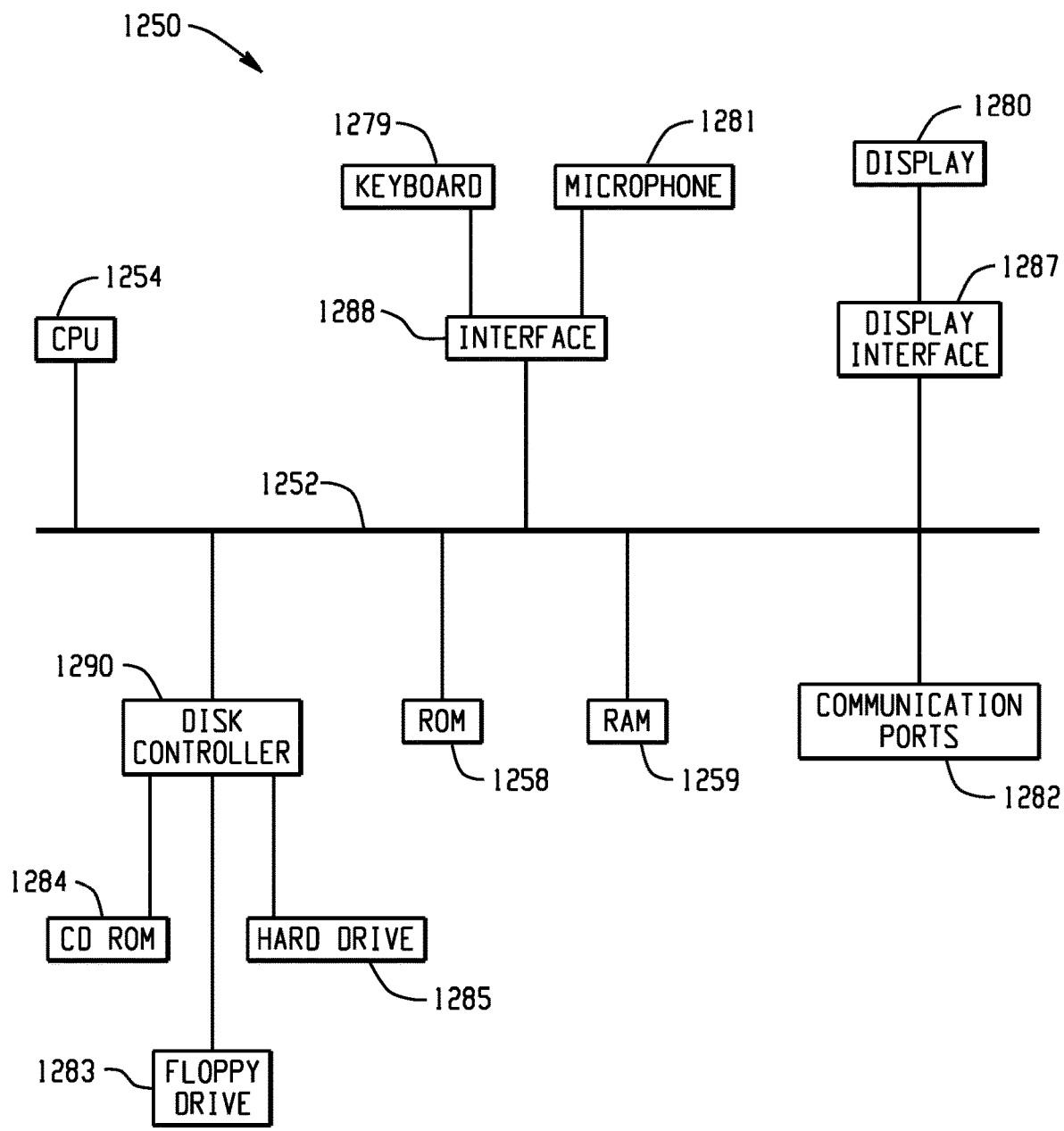

FIGS. 12A, 12B, and 12C depict example systems for implementing the approaches described herein for implementing a computer-implemented interaction evaluation engine. For example, FIG. 12A depicts an exemplary system 1200 that includes a standalone computer architecture where a processing system 1202 (e.g., one or more computer processors located in a given computer or in multiple computers that may be separate and distinct from one another) includes a computer-implemented interaction evaluation engine 1204 being executed on the processing system 1202. The processing system 1202 has access to a computer-readable memory 1207 in addition to one or more data stores 1208. The one or more data stores 1208 may include speech and motion features 1210 as well as scores 1212. The processing system 1202 may be a distributed parallel computing environment, which may be used to handle very large-scale data sets.

FIG. 12B depicts a system 1220 that includes a client-server architecture. One or more user PCs 1222 access one or more servers 1224 running a computer-implemented interaction evaluation engine 1237 on a processing system 1227 via one or more networks 1228. The one or more servers 1224 may access a computer-readable memory 1230 as well as one or more data stores 1232. The one or more data stores 1232 may include speech and motion features 1234 as well as scores 1238.

FIG. 12C shows a block diagram of exemplary hardware for a standalone computer architecture 1250, such as the architecture depicted in FIG. 12A that may be used to include and/or implement the program instructions of system embodiments of the present disclosure. A bus 1252 may serve as the information highway interconnecting the other illustrated components of the hardware. A processing system 1254 labeled CPU (central processing unit) (e.g., one or more computer processors at a given computer or at multiple computers), may perform calculations and logic operations required to execute a program. A non-transitory processor-readable storage medium, such as read only memory (ROM) 1258 and random access memory (RAM) 1259, may be in communication with the processing system 1254 and may include one or more programming instructions for performing the method of implementing a computer-implemented interaction evaluation engine. Optionally, program instructions may be stored on a non-transitory computer-readable storage medium such as a magnetic disk, optical disk, recordable memory device, flash memory, or other physical storage medium.

In FIGS. 12A, 12B, and 12C, computer readable memories 1208, 1230, 1258, 1259 or data stores 1208, 1232, 1283, 1284, 1288 may include one or more data structures for storing and associating various data used in the example systems for implementing a computer-implemented exam item generation engine. For example, a data structure stored in any of the aforementioned locations may be used to store data from XML files, initial parameters, and/or data for other variables described herein. A disk controller 1290 interfaces one or more optional disk drives to the system bus 1252. These disk drives may be external or internal floppy disk drives such as 1283, external or internal CD-ROM, CD-R, CD-RW or DVD drives such as 1284, or external or internal hard drives 1285. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 1290, the ROM 1258 and/or the RAM 1259. The processor 1254 may access one or more components as required.

A display interface 1287 may permit information from the bus 1252 to be displayed on a display 1280 in audio, graphic, or alphanumeric format. Communication with external devices may optionally occur using various communication ports 1282.

In addition to these computer-type components, the hardware may also include data input devices, such as a keyboard 1279, or other input device 1281, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

While the disclosure has been described in detail and with reference to specific embodiments thereof, it will be apparent to one skilled in the art that various changes and modifications can be made therein without departing from It is claimed:

1. A computer-implemented method for acquiring physical-world data indicative of interactions of a subject with an avatar for evaluation, comprising:
    providing, in a graphical user interface, an interactive avatar for interaction with the subject;
    capturing, using a microphone, speech from the subject to the avatar and performing automatic speech recognition to generate speech content data to determine content of the subject speech;
    capturing, using an infrared sensor or video sensor, motion data from the subject interacting with the avatar, the motion data comprising a plurality of frames;
    assigning each frame in the motion data to one of a plurality of clusters generated through k-means clustering on a space of body postures in a training set;
    generating a plurality of vectors of lag-τ cooccurrences based on the assigned clusters;
    determining a next action of the interactive avatar based on the content of the subject speech captured using the microphone and the generated vectors, wherein the actions each comprise a change in a representation of the avatar of one or more of: speech, body posture, facial expressions, lip movements, or emotion of the avatar;
    implementing the next action to cause at least one of speech, body posture, facial expressions, lip movements, or emotion of the avatar in the graphical user interface to change; and
    determining, using a trained regression scoring model, a score for the subject based on the content of the subject speech and the motion data.

2. The method of claim 1, wherein the subject is a teacher candidate who is being evaluated; and
    wherein the interactive avatar comprises multiple avatars representing students that the teacher candidate is presenting a lesson as part of a teacher candidate evaluation.

3. The method of claim 1, wherein the motion data comprise data indicative of body posture and facial expressions of the subject.

4. The method of claim 1, wherein implementing the next action comprises outputting synthesized speech via a speaker.

5. The method of claim 1, further comprising:
    receiving a further action of the avatar from a human controller; and
    implementing the further action of the avatar.

6. The method of claim 5, further comprising matching the human controller to the subject, wherein matching the human controller to the subject comprises:
    identifying a plurality of qualified human controllers for the evaluation;
    applying one or more filters to the qualified human controllers;
    when applying the one or more filters results in at least one qualified human controller remaining, selecting the human controller from the at least one qualified human controller remaining;
    when no qualified human controllers remain after applying the one or more filters, relaxing one or more of the one or more filters.

7. The method of claim 1, wherein the score is provided via a graphical user interface as an evaluation of an interview candidate.

8. The method of claim 1, wherein determining the score for the subject comprises providing the content of the subject speech and the motion data to the scoring model, wherein the scoring model generates the score for the subject based on the content of the subject speech and the motion data without human interaction.

9. The method of claim 8, further comprising training the scoring model, wherein training the scoring model comprises:
    capturing training speech content, training motion data, and a human-generated score for a training interaction; and
    training the scoring model based on the training speech content, training motion data, and a human-generated score.

10. The method of claim 1, wherein the motion data comprises hip location data and hand location data.

11. The method of claim 10, wherein a body posture is determined based on the hip location data and the hand location data, wherein the next action of the interactive avatar is determined based on the body posture, and wherein the score for the subject is determined based on the body posture.

12. The method of claim 1, wherein the score is determined based on fluency, intonation, stress, rhythm, pronunciation, and grammar of the captured speech.

13. A computer-implemented system for acquiring physical-world data indicative of interactions of a subject with an avatar for evaluation, comprising:
    a processing system;
    a non-transitory computer-readable medium encoded with instructions for commanding the processing system to execute operations comprising:
        providing, in a graphical user interface, an interactive avatar for interaction with the subject;
        capturing, using a microphone, speech from the subject to the avatar and performing automatic speech recognition to determine content of the subject speech;
        capturing, using an infrared sensor or video sensor, motion data from the subject interacting with the avatar, the motion data comprising a plurality of frames;
        assigning each frame in the motion data to one of a plurality of clusters generated through k-means clustering on a space of body postures in a training set;
        generating a plurality of vectors of lag-τ cooccurrences based on the assigned clusters;
        determining, a next action of the interactive avatar based on the content of the subject speech captured by the microphone and the generated plurality of vectors, wherein the actions each comprise a change in a representation of the avatar of one or more of: speech, body posture, facial expressions, lip movements, or emotion of the avatar;
        implementing the next action to cause at least one of speech, body posture, facial expressions, lip movements, or emotion of the avatar in the graphical user interface to change; and
        determining a score for the subject based on the content of the subject speech and the motion data by providing the content of the subject speech and the motion data to a trained regression scoring model.

14. The system of claim 13, wherein the subject is a teacher candidate who is being evaluated; and wherein the interactive avatar comprises multiple avatars representing students that the teacher candidate is presenting a lesson as part of a teacher candidate evaluation.

15. The system of claim 13, wherein the motion data comprise data indicative of body posture and facial expressions of the subject.

16. The system of claim 13, wherein the operations further comprise:
receiving a further action of the avatar from a human controller; and
implementing the further action of the avatar.

17. The system of claim 16, wherein the operations further comprise: matching the human controller to the subject, wherein matching the human controller to the subject comprises:
identifying a plurality of qualified human controllers for the evaluation;
applying one or more filters to the qualified human controllers;
when applying the one or more filters results in at least one qualified human controller remaining, selecting the human controller from the at least one qualified human controller remaining;
when no qualified human controllers remain after applying the one or more filters, relaxing one or more of the one or more filters.

18. The system of claim 13, wherein the score is provided via a graphical user interface as an evaluation of an interview candidate.

19. The system of claim 13, further comprising training the scoring model, wherein training the scoring model comprises:
capturing training speech content, training motion data, and a human-generated score for a training interaction; and
training the scoring model based on the training speech content, training motion data, and a human-generated score.

20. A non-transitory computer-readable medium encoded with instructions for commanding a processing system to execute steps of a method for acquiring physical-world data indicative of interactions of a subject with an avatar for evaluation, the steps comprising:
providing, in a graphical user interface, an interactive avatar for interaction with the subject;
capturing, using a microphone, speech from the subject to the avatar and performing automatic speech recognition to determine content of the subject speech;
capturing, using an infrared sensor or video sensor, motion data from the subject interacting with the avatar, the motion data comprising a plurality of frames;
assigning each frame in the motion data to one of a plurality of clusters generated through k-means clustering on a space of body postures in a training set;
generating a plurality of vectors of lag-τ cooccurrences based on the assigned clusters;
determining a next action of the interactive avatar based on the content of the subject speech and the generated plurality of vectors, wherein the actions each comprise a change in a representation of the avatar of one or more of: speech, body posture, facial expressions, lip movements, or emotion of the avatar;
implementing the next action to cause at least one of speech, body posture, facial expressions, lip movements, or emotion of the avatar in the graphical user interface to change; and
determining, using a trained regression scoring model, a score for the subject based on the content of the subject speech and the motion data.

* * * * *